Jan. 28, 1964  L. FUCHS  3,119,481
TORQUE-REACTING DEVICES

Filed April 13, 1961  2 Sheets-Sheet 1

INVENTOR
LOUIS FUCHS

BY  *Harry G. Mapiro*

ATTORNEY

Jan. 28, 1964 L. FUCHS 3,119,481
TORQUE-REACTING DEVICES
Filed April 13, 1961 2 Sheets-Sheet 2

INVENTOR
LOUIS FUCHS
BY Harry G. Shapiro
ATTORNEY

United States Patent Office 3,119,481
Patented Jan. 28, 1964

3,119,481
TORQUE-REACTING DEVICES
Louis Fuchs, East Orange, N.J., assignor to Airborne Accessories Corporation, Hillside, N.J., a corporation of New Jersey
Filed Apr. 13, 1961, Ser. No. 102,688
12 Claims. (Cl. 192—45.1)

The invention is directed to improvements in clutches and brakes, hereinafter inclusively referred to as torque-reacting devices, of the type utilizing wedging means positioned between the radially spaced surfaces provided by a pair of coaxially arranged, relatively rotatable members for releasably connecting the members.

An object of the invention is to provide a torque-reacting device with wedging means which, together with the ability to provide substantially instantaneous transmission of torque or braking at maximum value, affords substantially zero break-away; that is, the force required for the wedging means to release from its torque-transmitting function or braking action is practically zero.

Another object of the invention is to provide a torque-reacting device with wedging means which, due to its structure and mode of action, furnishes substantial torque capacity for any given size thereof, possesses unusually long operating life, and retains the ability to provide substantially initial rated torque capacity despite prolonged use under heavy loads. In effect, a torque-reacting device provided with the wedging means of the invention is self-compensating to adjust for wear.

A further object of the invention is to provide a torque-reacting device with wedging means in the form of an assembly of elements in which the elements have a configuration permitting them to be sized to accommodate an unusually wide range of units, including torque-reacting devices of extremely small size, without incurring the operational limitations imposed by known sprag configurations.

Still a further object of the invention is to provide a wedging assembly, the parts of which possess a configuration of such geometrical simplicity that their fabrication is accomplished easily and inexpensively.

These, and other objects and advantages will be apparent from the following description of a preferred embodiment of the invention, taken in conjunction with the drawings, in which.

Figure 1:
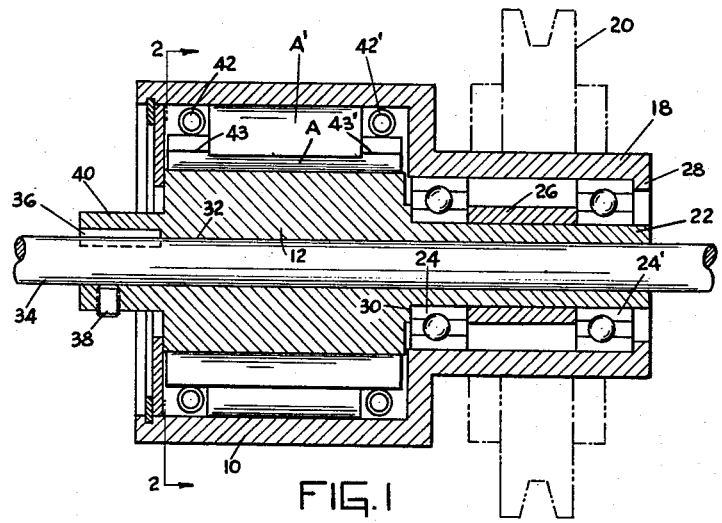
FIG. 1 is a vertical cross-sectional view, partly in elevation, illustrating the wedging means of the invention as applied to a clutch.

In accordance with the invention generally, the wedging means comprises an assembly of two elements, each element having a cross-section which provides a flat face and an opposite convex face. The convex faces possess a substantial or large radius of curvature. The elements are assembled with their flat faces in engagement with each other and with their convex faces in respective engagement with the radially spaced surfaces provided by the pair of coaxially arranged, relatively rotatable members of a torque-reacting device. Both members may be mounted for rotation, or one member may be fixed to prevent its rotation, with the second member mounted for rotation.

The elements of the wedging assembly are dimensioned so that their assembled height would be greater than the spacing between the radially spaced surfaces or races between which the assembly is positioned, if the elements were related so that their areas of maximum height were in alignment with one another and, of course, if the assembly were not confined by the fixed spacing between the races. The elements, however, are assembled with their areas of maximum height laterally offset from one another. The areas of engagement or the points of contact of the convex faces with the respective radially spaced surfaces are also offset from one another, being located on opposite sides of a radial line extended between the races substantially centrally through the assembly. Preferably, means in the form of a spring is provided to urge the elements into engagement with one another and with the races.

With the elements assembled in the manner described, they are capable of relative linear movement to a limited extent, such type of movement being permitted by the ability of the elements to slide where their flat faces engage one another, the convex faces being in resilient, frictional engagement with the respective races. As a result, the effective height of the assembly may be changed to the extent that the elements' areas of maximum height are moved toward or away from one another. Thus, as soon as one of the races is rotated in a direction which causes the adjoining wedging element with which it is frictionally engaged to be displaced in a direction which moves the elements' areas of maximum height toward one another, the effective height of the assembly is increased, thereby firmly connecting the races. Release of the races is immediately accomplished when the relative movement of the races causes the elements' areas of maximum height to move apart. Due to the geometry of the parts, the extent of movement of the elements to connect and to release is very small; the tolerances for effective operation, however, are large.

In greater detail, reference is made to FIGS. 1, 2, 4 and 5, illustrating the invention as applied to a one-way clutch. As shown, a pair of coaxially arranged members 10 and 12 are each mounted for rotation. The members provide radially spaced, concentric surfaces 14 and 16. The surfaces are in exact parallelism, and in the form of the invention illustrated, these surfaces are smooth and unbroken by any recesses or the like. The member 10, which provides the outer race, is formed with a hub 18 to which may be secured a sheave 20 for rotation therewith. It will be understood that any suitable power transmitting means may be mounted on the clutch, such as a gear or a cam, or the like. The member 12, which provides the inner race, is formed with a sleeve portion 22 having a smaller diameter than the hub 18. The sleeve extends into the hub. Spaced bearings 24 and 24' are positioned between the hub and the sleeve. An annular spacer 26 may be placed between the bearings, which are confined on one side by a flange 28 extending radially inward from the end of the hub, and on the other side by a radial shoulder 30 formed on the inner rotatable member. The inner rotatable member is provided with a longitudinally extending bore in communication with the interior of the sleeve 22 to receive a shaft 34. The shaft is splined to the inner member at 36, and relative longitudinal movement is prevented by the provision of a set screw 38 extending through a hub portion 40 formed as part of the inner clutch member. The power may be delivered to the shaft or, when the power is delivered to the sheave, the shaft will serve as the driven member.

Figure 2:
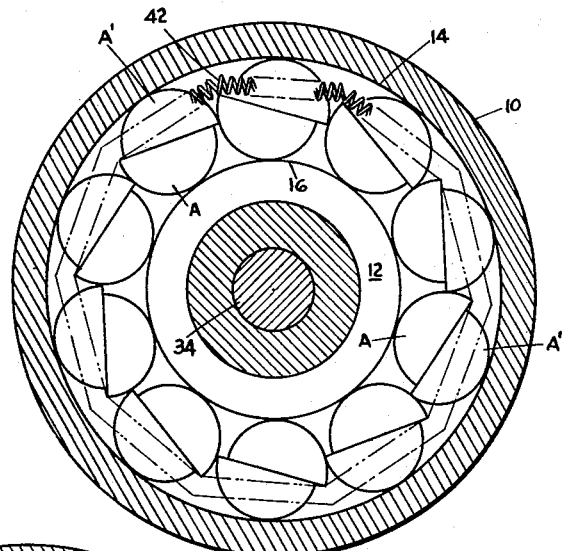
FIG. 2 is a view taken substantially in the plane of line 2—2 of FIG. 1.

As shown in FIG. 2, a series of wedging assemblies are positioned between the races, or in the area between the concentric surfaces 14 and 16. The wedging assemblies preferably are positioned immediately adjacent one another to furnish maximum torque-transmitting capacity. If desired, the wedging assemblies may be alternated with intermediate, closely adjacent spacing means, such as solid cylindrical pins or balls, or other spacing means which may be resilient as well as rigid. The wedging assemblies are identical with one another so that the description of the construction and operation of one assembly is equally applicable to the remaining assemblies of the series.

Each wedging assembly comprises a pair of elements A and A', which preferably are of identical cross-section and dimensions for the purpose of symmetry and ease of manufacture. In the illustrated and preferred embodiment of the invention, the elements are in the form of semi-cylindrical pins having the same cross-sectional dimensions. As shown in FIG. 1, the pin A, which is positioned adjacent the inner race, is made of a longer length than the other pin so that resilient means in the form of garter springs 42 and 42' may be positioned for engagement with the extended ends 43 and 43' of the lower pins. The springs resiliently urge the pins toward one another and maintain the assembly in engagement with the races.

Figure 4:
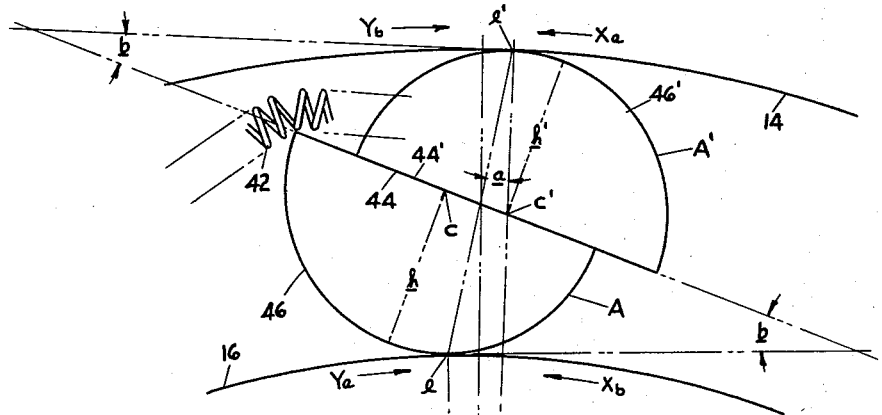
FIG. 4 is an enlarged view showing the relationship of the elements of one of the wedging assemblies shown in FIG. 2.

As shown in FIG. 4, the semi-cylindrical pins A and A' are assembled with respect to one another and with respect to the concentric surfaces 14 and 16 so that their flat faces 44 and 44' are in engagement for relative sliding or linear movement. The pins' convex faces 46 and 46' are located so that portions thereof are in respective engagement with the surfaces 16 and 14. The areas of maximum height of each of the pins, $h$ and $h'$, are of a magnitude so that if the pins were positionally related to place their areas of maximum height in alignment with one another, their assembled height or diameter would be greater than the radical spacing between the concentric surfaces 14 and 16. The pins, however, are laterally offset from one another, and are resiliently held in such offset relationship between the races by the springs 42 and 42'. The centers of curvature of the semi-cylindrical pins, or the points of maximum height $c$ and $c'$ at the pins' flat faces 44 and 44', are laterally offset from one another. The points $e$ and $e'$, where the convex faces 46 and 46' respectively contact or engage the concentric surfaces, are laterally offset from one another, being located on opposite sides of a radial line $r$ extended midway between the centers $c$ and $c'$ from the common center $o$ for the concentric surfaces 14 and 16.

The angle $a$, defined by a line extended between points of engagement $e$ and $e'$ and a radical line $r'$ extended from the common center $o$ intersecting a point of engagement, represents the angle of drive, or the driving angle. The driving angle is at least 2 degrees, and preferably within a range of 2 to 8 degrees.

The pins A and A' are related to one another and to the races so that the wedging assembly is capable of releasing substantially instantaneously and without drag on the races. The practically zero break-away, and absence of chatter, provided by the wedging assembly of the invention is obtained by providing a release angle $b$, which is greater than the friction angle of the material constituting the races and the wedging elements. Where the parts are of machined steel, the release angle is preferably in the range of 12 to 40 degrees, an angle of 20 degrees being most suitable. The friction angle of machined finish steel is approximately 7 degrees. The release angle is the angle defined by the plane of engagement of the flat faces 44 and 44' and the tangent line at the point of contact between a race and an adjoining wedging element.

Still referring to FIG. 4, when the outer race is the driving member and is rotated in the direction of the arrow $X_a$, the frictional engagement of the surface 14 with the convex face 46' acts to displace the pin A' in such direction of rotation, thereby moving the centers $c$ and $c'$ closer to one another. Relative movement may take place where the elements engage the races. Though the extent of movement involved to increase the effective or driving diameter of the assembly is exceedingly small, the inner race is firmly coupled to the outer race and rotated in the same direction, as indicated by the arrow $X_b$. This same action occurs, of course, when the inner race is made the driving member and rotated in the direction of the arrow $Y_a$, whereupon the outer race is driven in such direction, as shown by the arrow $Y_b$. As soon as the rotation of the driving member is stopped, or the relative rotation of the driving and driven members is such that the driving member is rotating at a slower speed than the driven member, then the wedging assembly releases immediately. The springs 42 and 42', by urging the areas of maximum height of the pins of each of the assemblies toward one another, virtually eliminate back-lash.

Figure 3:
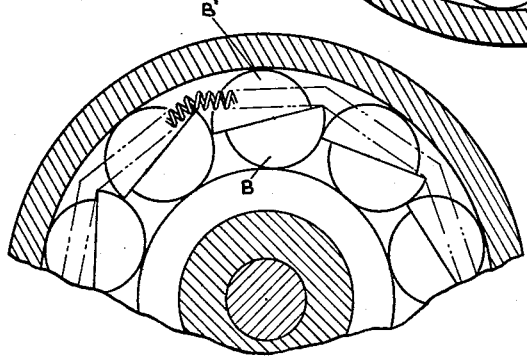
FIG. 3 is a partial view similar to FIG. 2, but showing the manner in which the elements of the wedging assembly are arranged for the transmission of torque in a direction opposite to the direction of torque transmission provided by the relationship of elements shown in FIG. 2.

Whether the inner member or the outer member is utilized for driving, the described clutch may be considered as a single directional drive. Where driving in the opposite direction is desired, a clutch having the wedging elements thereof arranged as shown in FIG. 3 is used. The elements of the wedging assembly, designated B and B', are arranged with the plane of engagement of their flat faces disposed at an angle opposite to the angle of the plane of engagement of the elements shown in FIG. 2.

It will be apparent that the described clutch is suitable for indexing, over-running or backstopping. With one of the races fixedly mounted, and the other rotatably mounted, the wedging assembly functions as a brake, or to eliminate feed-back torque.

While it is preferred that the elements of the wedging assembly both possess a semi-circular cross-section having the same dimensions, it is within the scope of the invention to provide other element cross-sections which furnish a flat face and an opposite convex face having a substantial radius of curvature. Also, it is not necessary that the cross-sectional dimensions of both elements be the same.

Figure 5:
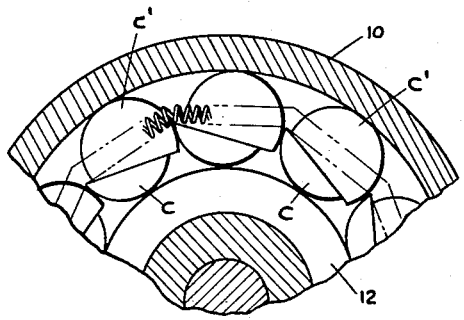
FIG. 5 shows a wedging assembly with elements of another form.

As shown in FIG. 5, the element C has a cross-sectional contour which is less than a semi-circle, whereas the co-acting element C' has a cross-sectional contour which is greater than a semi-circle.

Figure 6:
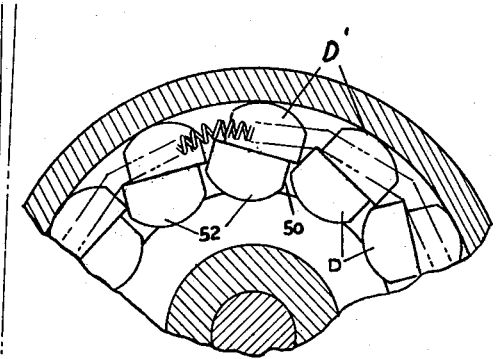
FIG. 6 shows a wedging assembly in which the elements possess still another configuration.

As shown in FIG. 6, the element D and D' are shaped to provide flats 50 on their sides, instead of having the convex face circumscribe the flat face as previously described. Wedging elements having such cross-sectional contour enable positioning a greater number of wedging assemblies within a given circumferential area between races, thereby increasing the torque capacity of the clutch or brake. It will be further apparent that with these wedging elements of reduced width, it is not essential that the cross-sectional dimensions of a pair be identical; the heights of the elements of a pair may be different, as shown in FIG. 5.

Moreover, while it is preferred that the radially spaced surfaces of the relatively rotatable members simply provide smooth, unbroken, parallel surfaces throughout; if desired, one or both races may be provided with recesses 52, as shown in FIG. 6.

It is believed that some of the advantages and improved results furnished by the torque-reacting device of the invention will be apparent from the foregoing description of a preferred embodiment of the invention. The elements' flat faces engage one another at a positive angle, act to firmly maintain the elements in assembled relationship, and provide increased effectiveness as the load is increased. The cross-section of the elements permits such a large radius of curvature for their convex faces that the possibility of jamming the assembly to the extent that the clutch or brake will not release when desired is eliminated. The contour of the wedging assembly elements permits a release angle which eliminates drag on the races, and chatter. The overall diameter of which the assembly is capable, together with the relatively large radius of curvature possessed by each of the convex faces, serve to maintain the operating characteristics of the clutch at a high level, despite extended use under heavy load. The relationship of the wedging elements with respect to each other and with respect to the races is such that compensation is provided for wear, and changes which may occur in the points of engagement or contact. In effect, the wedging assembly is self-compensating for wear. Furthermore, the flat faces and the convex faces' substantial radius of curvature for any given size of elements affords effective operating wedging assemblies for clutches and brakes of extretmely small size, as well as for units of large sizes.

While a preferred embodiment of the invention has been illustrated and described, it will be understood that it is within the scope of the invention to make various changes and modifications without departing from the spirit and scope of the invention as sought to be defined in the following claims.

I claim:

1. In a torque-reacting device including a pair of coaxial members providing radially spaced surfaces, at least one of the members being mounted for rotation, a wedging assembly positioned between said surfaces comprising a pair of elements of substantially the same shape and each having a flat face and an opposite convex face, the elements being assembled with their flat faces in engagement with each other and with their convex faces in respective engagement with said radially spaced surfaces, resilient means in engagement with one of the elements to urge the elements together and against said surfaces, the elements being dimensioned so that their assembled height would be greater than the spacing between said surfaces if the elements were related so that their areas of maximum height were in alignment with one another, said elements being assembled with their areas of maximum height offset from one another.

2. In a torque-reacting device including a pair of coaxial members providing radially spaced surfaces, at least one of the members being mounted for rotation, a wedging assembly positioned between said surfaces comprising a pair of elements each having a cross-section providing a flat face and an opposite convex face having a substantial radius of curvature, the elements being assembled with their flat faces in engagement with each other and with their convex faces in respective engagement with said radially spaced surfaces, resilient means in engagement with one of the elements to urge the elements together and against said surface, the elements being dimensioned so that their assembled height would be greater than the spacing between said surfaces if the elements were related so that their areas of maximum height were in alignment with one another, said elements being assembled with their areas of maximum height offset from one another, the plane of engagement of the flat faces being angularly related with respect to the tangent line at the point of engagement of a convex face with an adjoining surface to provide a release angle greater than the friction angle of the engaging surfaces.

3. In a torque-reacting device as set forth in claim 2, a wedging assembly wherein the elements thereof each have a substantially semi-circular cross-section of the same dimensions.

4. In a torque-reacting device including a pair of coaxial members providing spaced concentric surfaces, at least one of the members being mounted for rotation, a wedging assembly positioned between said surfaces comprising a pair of substantially semi-cylindrical elements having substantially the same cross-sectional dimensions, the elements being assembled with their flat faces in engagement with each other and with their convex faces in respective engagement with said concentric surfaces, resilient means in engagement with one of the elements for urging the elements into engagement at their flat faces and into engagement with said concentric surfaces, the elements being dimensioned so that their assembled height would be greater than the spacing between said surfaces if the elements were related so that their areas of maximum height were in alignment with one another, said elements being assembled with their areas of maximum height offset from one another, the plane of engagement of the flat faces being angularly related with respect to the tangent line at the point of engagement of a convex face with an adjoining concentric surface to provide a release angle greater than the friction angle of the engaging surfaces.

5. In a torque-reacting device including a pair of coaxial members providing spaced concentric surfaces, at least one of the members being mounted for rotation, a wedging assembly positioned between said surfaces comprising a pair of substantially semi-cylindrical elements, the elements being assembled with their flat faces in engagement with each other and with their convex faces in respective engagement with said concentric surfaces, one of the elements being longer than the other and disposed adjacent the concentric surface having the smaller radius of curvature, the ends of the longer element extending beyond the other element, resilient means in engagement with the ends of the longer element to urge the elements together and against said concentric surfaces, the elements being dimensioned so that their assembled height would be greater than the spacing between said surfaces if the elements were related so that their areas of maximum height were in alignment with one another, said elements being assembled with their areas of maximum height offset from one another, the plane of engagement of the flat faces being angularly related with respect to the tangent line at the point of engagement of a convex face with an adjoining concentric surface to provide a release angle greater than the friction angle of the engaging surfaces.

6. In a torque-transmitting device including a pair of coaxial members providing radially spaced inner and outer races, at least one of the members being mounted for rotation, a plurality of wedging assemblies immediately adjacent one another positioned between said races, each of said assemblies comprising a pair of pins each having a cross-section providing a flat face and an opposite convex face having a substantial radius of curvature, the pins being assembled with their flat faces in engagement with each other and with their convex faces in respective engagement with said inner and outer races, one of the pins of each assembly being longer than the other and disposed adjacent the inner race, the ends of the longer pin extending beyond the other pin, resilient means in engagement with the ends of the longer pins of each of the assemblies to urge the pins together and against said races, the pins being dimensioned so that their assembled height would be greater than the spacing between said races if the pins were related so that their areas of maximum height were in alignment with one another, said pins being assembled with their areas of maximum height laterally offset from one another, the points of engagement of the convex faces with the respective races providing an angle of drive not less than approximately 2 degrees, and the plane of engagement of the flat faces being related to the tangent line at the point of engagement of a convex face with an adjoining race to provide a release angle not less than approximately 12 degrees.

7. In a torque-transmitting device as set forth in claim 6, wedging assemblies wherein the pins thereof each have a substantially semi-circular cross-section of substantially the same cross-sectional dimensions.

8. In a torque-transmitting device as set forth in claim 6, wherein the races are concentric and parallel throughout.

9. In a torque-transmitting device as set forth in claim 6, wherein the races are concentric and parallel throughout, wherein the pins of the wedging assemblies each have a substantially semi-circular cross-section of substantially the same cross-sectional dimensions, wherein the angle of drive is between approximately 2 and 8 degrees, and wherein the release angle is approximately 20 degrees.

10. In a torque-transmitting device as set forth in claim 6, wherein the inner race is provided with circumferentially spaced recesses, each recess having a pin of a wedging assembly positioned therein.

11. In a torque-transmitting device as set forth in claim 6, wherein the pins are each formed with flat faces on the sides thereof extending substantially at a right angle to the flat face in engagement with the flat face of the other pin of an assembly, and wherein the inner race is provided with circumferentially spaced recesses, each recess having a pin of a wedging assembly positioned therein.

12. In a torque-transmitting device as set forth in claim 6, wherein the pins are each formed with flat faces on the sides thereof extending substantially at a right angle to the flat face in engagement with the flat face of the other pin of an assembly, wherein the inner race is provided with circumferentially spaced recesses, each recess having a pin of a wedging assembly positioned therein, wherein the pins of an assembly have substantially the same cross-sectional dimensions, wherein the angle of drive is between approximately 2 and 8 degrees, and wherein the release angle is approximately 20 degrees.

References Cited in the file of this patent

UNITED STATES PATENTS

| | | |
|---|---|---|
| 1,760,708 | Miller | May 27, 1930 |
| 1,944,069 | Connors | Jan. 16, 1934 |

FOREIGN PATENTS

| | | |
|---|---|---|
| 412,050 | Great Britain | June 21, 1934 |
| 1,146,081 | France | May 20, 1957 |